United States Patent [19]

Hida

[11] Patent Number: 5,350,237
[45] Date of Patent: Sep. 27, 1994

[54] TEMPERATURE MEASURING CIRCUIT FOR HEATING AND COOKING APPLIANCES

[75] Inventor: Kiyonori Hida, Daito, Japan

[73] Assignee: Funai Electric Co., Ltd., Daito, Japan

[21] Appl. No.: 962,405

[22] Filed: Oct. 16, 1992

[51] Int. Cl.⁵ .............................................. G01K 7/24
[52] U.S. Cl. ...................................... 374/183; 340/584;
324/725; 236/49.3
[58] Field of Search ................ 374/149, 183; 340/577,
340/584, 600; 324/96, 103 P, 105, 706, 721, 725,
610; 307/310; 236/49.3

[56] References Cited

U.S. PATENT DOCUMENTS

| | | | |
|---|---|---|---|
| 2,971,379 | 2/1961 | Weisheit | 374/183 |
| 3,927,571 | 12/1975 | Athey | 374/183 |
| 3,987,392 | 10/1976 | Kugelmann et al. | 324/96 |
| 4,213,125 | 7/1980 | Watanabe | 324/96 |
| 4,363,556 | 12/1982 | Belliveau et al. | 374/183 |
| 4,571,095 | 2/1986 | Stoffels | 374/183 |
| 5,051,615 | 9/1991 | Rosenthal | 574/183 |
| 5,279,145 | 1/1994 | Suzuki | 324/706 |

Primary Examiner—William A. Cuchlinski, Jr.
Assistant Examiner—G. Bradley Bennett
Attorney, Agent, or Firm—Lackenbach Siegel Marzullo Aronson & Greenspan

[57] ABSTRACT

In a temperature measuring circuit connecting a temperature sensor such as a thermistor to a standard voltage source through tap resistances, detecting a sensed value of the temperature sensor by comparing the voltage of the sensor connecting point with the specified voltage by a comparator, a simplified construction of the circuit makes it possible to detect failures of the temperature sensor such as breakage or burn-out.

7 Claims, 3 Drawing Sheets

TEMPERATURE MEASURING CIRCUIT FOR HEATING AND COOKING APPLIANCES

BACKGROUND OF THE INVENTION

This invention relates to a temperature measuring circuit equipped with a variable resistance-type temperature sensor such as a thermistor for heating and cooking appliances.

In general, in heating and cooking appliances such as bread baking devices and electronic ranges, a temperature sensor such as a thermistor for temperature measuring at a heating place is installed. The said temperature of the heating place is measured by the change of electrical resistance of said temperature sensor.

up to the present, data of potential differences between terminals of said temperature sensor installed in any place where the temperature is to be measured are memorized in a computer. By comparing said data with data of potential difference corresponding to the specified temperature memorized beforehand in said computer, the temperature in said place can be established. (Usually in this case, said prior memorized data are required for many hundred different temperatures.)

In general, the above-mentioned measuring system requires substantial memory for storing such amounts of data, which increases the assembly cost. Accordingly, for home appliances requiring temperature detection at only a few points (for example, 23° C., 28° C. and 32° C. are required for bread baking devices), a simplified measuring circuit, as described in the following, may be used.

The simplified temperature measuring circuit in accordance with the invention is composed of a plurality of fixed resistances operating in the same voltage as the voltage between terminals of said temperature sensor corresponding to the specified individual temperature to be detected, and said fixed resistances are exchangeably connected from time to time according to the required heating procedures, and by comparing said voltage generated in terminals of said sensor with the specified secondary voltage (usually equal to a half of the first standard voltage), it is checked whether the present temperature is the specified temperature or not.

On the other hand, in said temperature measuring circuit, as said temperature sensor such as the thermistor is exposed to high temperatures, there is a danger of breaking said sensor, and disconnecting a connector or having it fall out. When these deficiencies occur, even if said temperature to be detected has already reached the specified temperature, it is possible to cause overheating because of mis-detecting of that said temperature will be under said specified value owing to said detecting element kept in high resistance.

Although said sensor breakage is detectable by analyzing said data taken in said computer in the aforementioned system taking said data of potential difference between terminals of said temperature sensor in said CPU through an A/D convertor, it is very hard to detect said deficiency in this simplified temperature measuring system.

SUMMARY OF THE INVENTION

The object of this invention is to supply a temperature measuring circuit enabling the detection of accidents such as sensor breakage even in a comparatively simplified temperature measuring circuit.

A temperature measuring circuit applying this invention is a circuit which detects temperature by connecting a variable resistance-type temperature detecting element to a first standard voltage source through an impedance circuit, and by comparing the voltage between terminal voltage of said element with the voltage of a secondary standard voltage source. Further, each resistance connected in said impedance circuit is exchangeable into one of the resistances corresponding to said temperature to be detected and further one of high resistance.

Detailed Description of the Preferred Embodiment

The foregoing and other objects, features and advantages of this invention will become more apparent from a reading of the following description in connection with the accompanying drawings.

Figure 2:
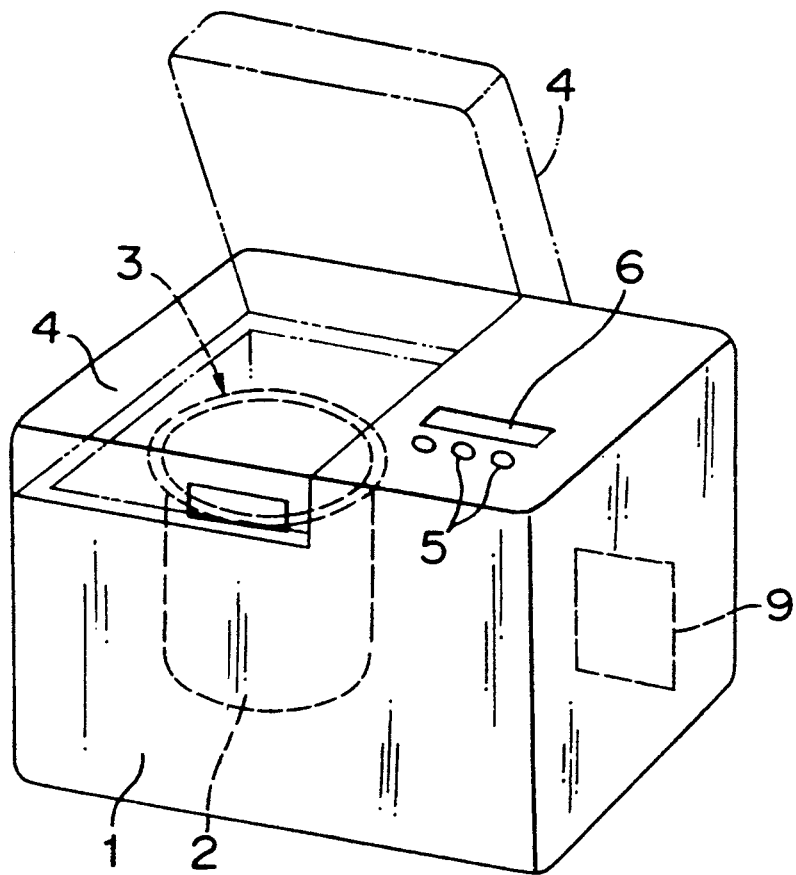
FIG. 2 shows a general perspective of a bread baking device equipped with said temperature measuring circuit shown in FIG. 1.

FIG. 2 shows a general projection of a home-use bread baking device equipped with a temperature measuring circuit applying this invention. The bread baking device is equipped with a heating chamber 3 containing a kneading vessel 2 provided therein with the raw ingredients for baking bread, in the main body 1. The numerical 4 is a cover plate for said heating chamber 3, the numerical 5 are operating buttons and numeric 6 is a liquid crystal display (LCD) for displaying operating modes.

Thermistor 7, namely one example of the variable resistance type temperature detecting elements in this measuring circuit applied to this invention, is securely installed on the inner wall of the heating chamber 3, and the temperature measuring circuit 8 is mounted on a printed board 9 located at a position separated from the heating chamber 3.

More specifically, the temperature measuring circuit is composed of a centralized processing unit 10 (CPU), transistors 11 acting with the signals from the terminals A ($A_1$, $A_2$,- - - $A_5$) of said CPU. A standard voltage source S connected to the terminal 12 of said thermistor 7, and resistances R ($R_1$, $R_2$,- - - $R_5$) connected between said transistors 11 and said thermistor 7, and connections 13 of the resistances R adjoining the thermistor 7 are connected to terminal B of the CPU 10. Numeric 14 is a connector connected to the ends of thermistor 7. One terminal 15 of the connector is grounded.

The resistances R are composed of 5 individual resistances ($R_1$, $R_2$, - - - $R_5$) and only one of the resistances R is at one time connected to the standard voltage S through transistors 11 wherein only one transistor is closed by the signal outputted from any one of the terminals of the CPU 10.

Consequently, the potential difference E between terminals of the thermistor 7 is applied to the terminal B and also to a comparator 16 through the CPU 10. In the comparator 16, the potential difference E is compared with a secondary standard voltage S/2 (usually specified as half of the primary standard voltage S), then the results of said comparison are again applied to the CPU 10. In other words, if E is larger than S/2 a signal "0" is input into CPU 10; if smaller, signal "1" is input.

Four resistances out of the five resistances ($R_1$, $R_2$, --- $R_5$) are selected to individually have the same resistance value (for example, 50 kΩ, 100 kΩ, 300 kΩ) corresponding to the temperatures of the thermistor 7 (for example 23° C., 32° C., and 185° C.) and the remaining one resistance (for example $R_1$) is designed to have a specially higher resisting value than the resistance value of said thermistor 7 at the normal temperature.

In this embodiment, the resistance R, has a resistance 3.3MΩ larger than 10 times the value of the other resistances. The high resistance $R_1$ is preferably more than 1MΩ. Namely, this temperature measuring circuit is designed as showing an extremely low potential difference between terminals of the resistor 7 when exchanged into said high resistance.

Figure 3:
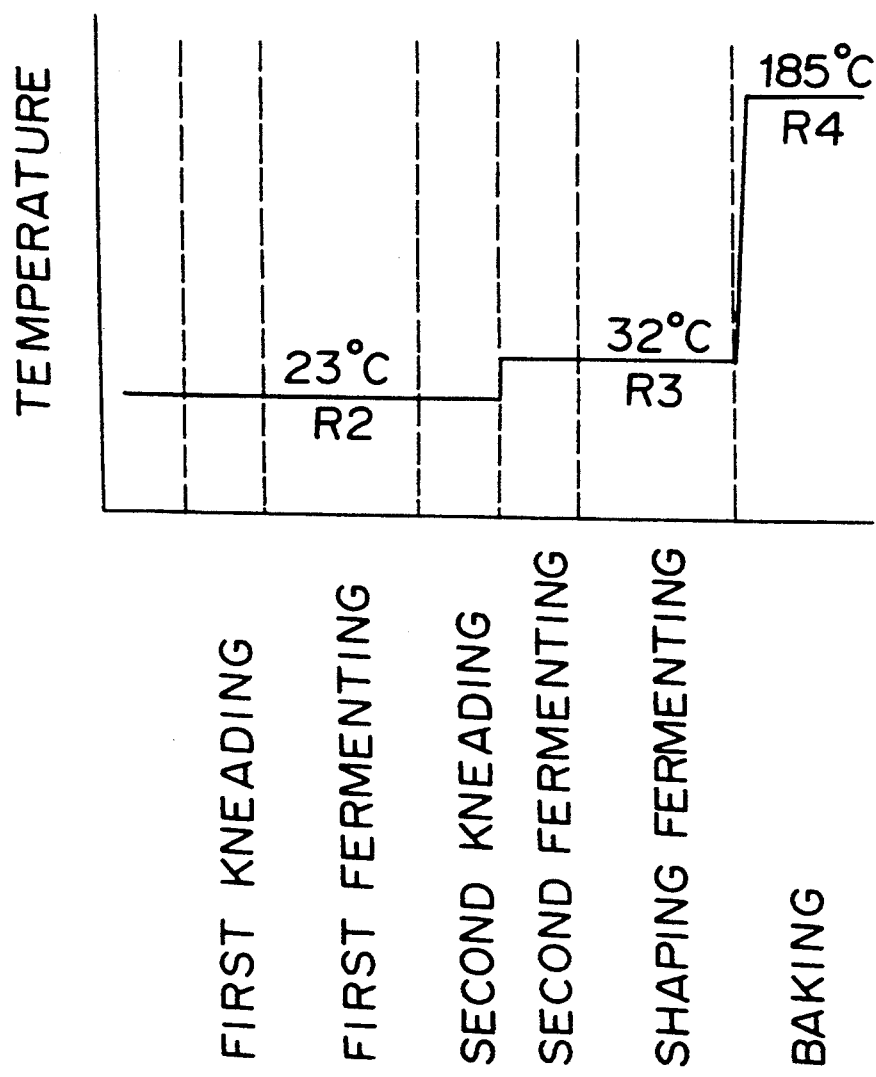
FIG. 3 shows a schematic graph indicating the individual set-up temperature of each step of the bread baking process.

Furthermore, the specified resistances $R_2$, $R_3$, $R_4$ corresponding to each temperature specified in each bread baking process applying a rekneading step as shown in FIG. 3.

In other words, the resistance $R_2$ corresponds to the temperature 23° C. to be kept in the heating chamber while the first kneading and fermenting steps and secondary kneading steps are performed, and the resistance $R_3$ corresponds to the temperature 32° C. while the secondary fermenting and shaping fermenting steps are performed, and at least the resistance $R_4$ corresponds to the temperature 185° C. in the baking step.

Furthermore, in the CPU 10, in addition to the function of operating the bread baking device according to the above-mentioned baking processes, many other functions such as automatic stopping, buzzer sounding, and displaying necessary messages on the LCD 6 are provided. These functions are also activated when said comparator 16 puts out a "0" signal.

Accordingly, the bread baking device performs specified processes as follows by pushing the start button. Namely, when starting the device, by changing the resistance R to the high resistance $R_1$, and by comparing the voltage E between terminals of said thermistor with said secondary standard voltage S/2, thermistor checking is performed. If E is smaller than S/2, by changing the resistance $R_1$ to the resistance $R_2$, the baking process progresses in one step. If E is larger than S/2, if the thermistor is defective, the CPU 10 instantly halts the operation of the baking device, sounds a buzzer and displays warnings such as "ERROR" or "SENSOR CHECK" on the LCD 6. The flow chart of this process is shown in FIG. 4.

Figure 4:
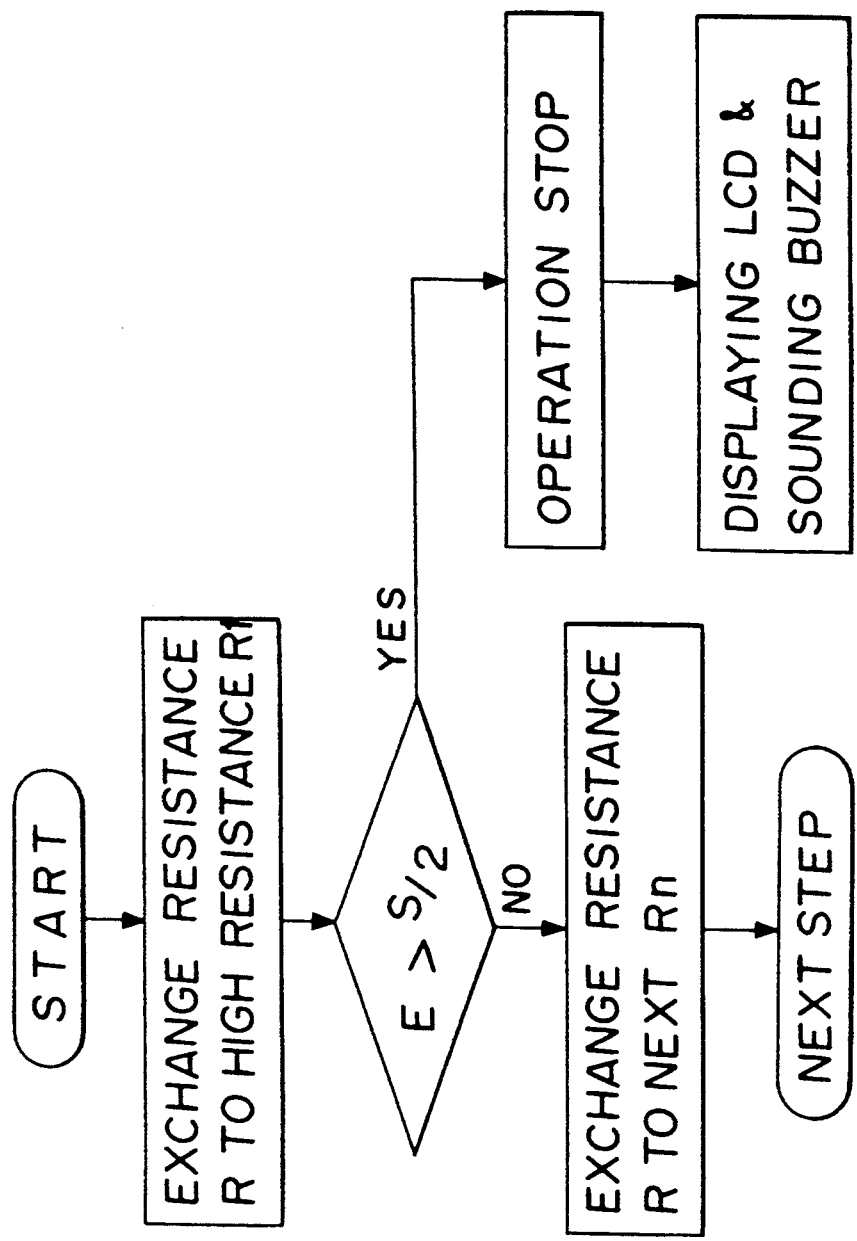
FIG. 4 shows a flow chart of said checking step of said temperature measuring circuit.

The checking operation mentioned above is repeated at every starting time for each bread baking step, including starting of the device according to the flow shown in FIG. 4. As a result, the flow shown in FIG. 4 is a sub-routine of the bread baking routine, and performed at every step during each step of the bread baking process. Also if the processing time of the sub-routine is short, it may be possible to repeat at each processing step.

As above-mentioned, the temperature measuring device according to this invention can easily detect the failure of the temperature sensor, such as breakage, in spite of the simplified construction.

Figure 1:
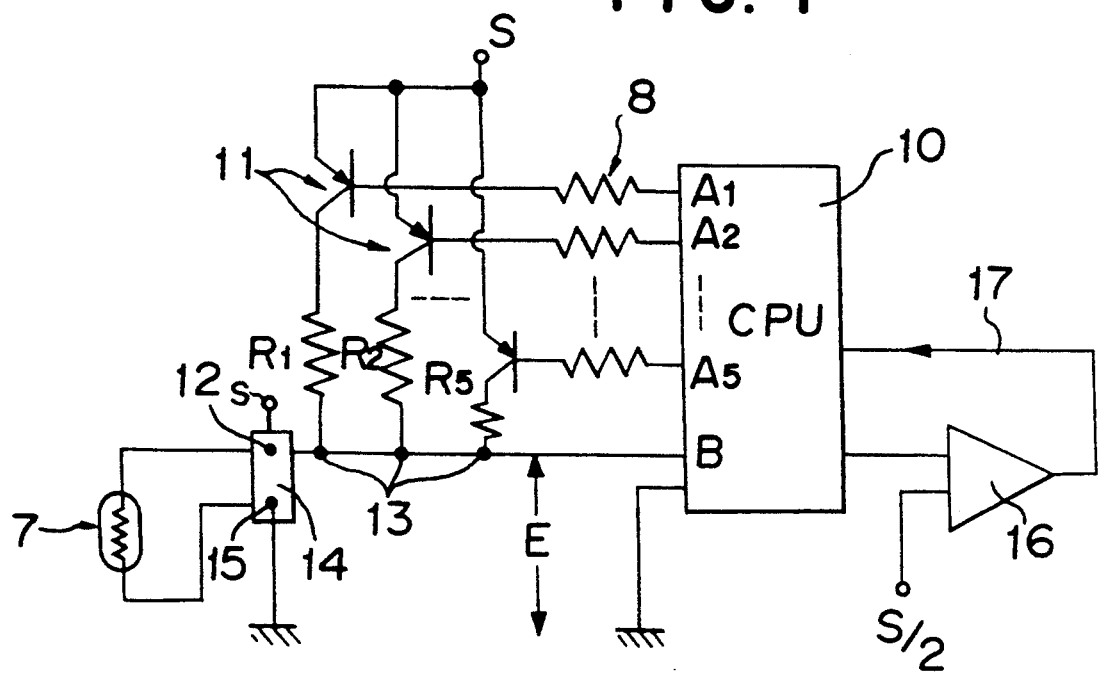
FIG. 1 shows a simplified temperature measuring circuit applying this invention.

"Accordingly, the temperature circuit of the present invention which is used in connection with heating and cooking appliances, operates when any one of resistors $R_1$, $R_2$ . . . $R_5$, as best shown in FIG. 1, is selected, a control voltage E is generated by its resistor and the temperature detecting means 7; and this control voltage E is compared by comparator means 16, whereby its output 17 is input into CPU 10. In such case, if the signal is "1", the heater source is turned off, while if the signal if "0", the heater source turns on, whereby the temperature of the CPU 10 is controlled. In addition, each value of resistors $R_1$, $R_2$ . . . $R_5$, is preset at a certain temperature (for example, $R_2$ is set at 32° C. and $R_4$ is set at 185° C. as shown in FIG. 3) and verified as such. Thus the circuit of the present invention is not an actual temperature/measuring circuit, but operates more like a temperature control circuit in operation."

What is claimed is:

1. A temperature measuring circuit for heating and cooking appliances operative at predetermined temperatures, comprising a resistance network comprising a plurality of resistors having different resistance values; temperature detecting means exhibiting changes in resistance responsive to temperature variations; said temperature detecting means selectively cooperating with one of resistors at each predetermined temperature for generating first control voltage representative of an associated predetermined temperature; comparator means for comparing each control voltage with a reference voltage; and switching means for switching one of said resistors to cooperate with said temperature detecting means when a preselected relationship is established between said control and reference voltages.

2. A measuring circuit as defined in claim 1, wherein one of said resistors in said resistance network has a value substantially greater than the resistances of the other resistors in the network, said one of said resistors when cooperating with said temperature detecting means generating a second control voltage representative of a failure of said temperature detecting means.

3. A measuring circuit as defined in claim 1, wherein said temperature detecting means comprises a thermistor.

4. A measuring circuit as defined in claim 1, wherein a source of voltage is provided for applying a predetermined voltage to said resistance network, and means for providing said reference voltage equal to substantially one-half of said predetermined voltage.

5. A measuring circuit as defined in claim 1, wherein said plurality of resistors each has one terminal connected to said temperature detecting means and another terminal connected to said switching means.

6. A measuring circuit as defined in claim 5, wherein said switching means comprises a transistor connected in series with each resistor; and a CPU means for selectively actuating one of said transistors, whereby only the resistor in series with an actuated transistor effectively cooperates with said temperature detecting means.

7. A measuring circuit as defined in claim 6, further comprising display means controlled by said CPU means for providing a visual display representative of said predetermined temperatures.

* * * * *